US012579999B2

(12) United States Patent
Tieu

(10) Patent No.: US 12,579,999 B2
(45) Date of Patent: Mar. 17, 2026

(54) SPEED CONTROL OF ACTUATOR ARM AND SPINDLE IN A DATA STORAGE DEVICE

(71) Applicant: Western Digital Technologies Inc., San Jose, CA (US)

(72) Inventor: Triet Tieu, Milipitas, CA (US)

(73) Assignee: Western Digital Technologies Inc., San Jose, CA (US)

( * ) Notice: Subject to any disclaimer, the term of this patent is extended or adjusted under 35 U.S.C. 154(b) by 0 days.

(21) Appl. No.: 18/661,857

(22) Filed: May 13, 2024

(65) Prior Publication Data

US 2025/0349320 A1 Nov. 13, 2025

(51) Int. Cl.
*G11B 19/22* (2006.01)
*G11B 19/20* (2006.01)
*G11B 19/28* (2006.01)

(52) U.S. Cl.
CPC .......... *G11B 19/22* (2013.01); *G11B 19/2009* (2013.01); *G11B 19/2063* (2013.01); *G11B 19/28* (2013.01)

(58) Field of Classification Search
None
See application file for complete search history.

(56) References Cited

U.S. PATENT DOCUMENTS 4,384,311 A 5/1983 McNeil
4,831,469 A * 5/1989 Hanson ................. G11B 21/12
318/400.42

4,979,048 A * 12/1990 Shimada ................ G11B 19/20
386/338
5,863,237 A 1/1999 Felts et al.
6,160,368 A 12/2000 Plutowski
6,243,222 B1 6/2001 Boutaghou et al.
6,476,996 B1 * 11/2002 Ryan ........................ G11B 5/54
6,914,740 B1 * 7/2005 Tu ........................ G11B 5/5534
6,954,324 B1 * 10/2005 Tu .......................... G11B 19/28
360/73.03
7,088,532 B1 8/2006 Krajnovich et al.
7,095,579 B1 * 8/2006 Ryan ....................... G11B 21/12
7,289,288 B1 * 10/2007 Tu ....................... G11B 5/5526
360/77.02
7,633,702 B1 * 12/2009 Heimbaugh ....... G11B 19/2063
360/75

(Continued)

OTHER PUBLICATIONS

Lee et al., Advanced Unloading Analysis Considering Lateral Velocity and Disk RPM Drop in Emergency Parking, IEEE Transactions on Magenetics, vol. 45, No. 11, Nov. 2009, pp. 4937-4940, Retrieved from https://www.researchgate.net/publication/224607915_ Advanced_Unloading_Analysis_Considering_Lateral_Velocity_and_ Disk_RPM_Drop_in_Emergency_Parking.

*Primary Examiner* — Fred Tzeng
(74) *Attorney, Agent, or Firm* — NOD Law PC

(57) ABSTRACT

A data storage device comprises a disk; a spindle on which the disk is mounted; a spindle motor that rotates the spindle; an actuator arm configured with a recording head; and an actuator that rotates the actuator arm about a pivot to move the actuator arm radially across a disk surface. Control circuitry controls the actuator to move the actuator arm across the disk surface while simultaneously applying an active brake to decelerate the spindle by controlling a driver voltage to be out of phase with a back electromotive force (BEMF) voltage of the spindle motor.

17 Claims, 8 Drawing Sheets

(56)                    References Cited

U.S. PATENT DOCUMENTS

| | | | | |
|---|---|---|---|---|
| 7,715,145 | B2 * | 5/2010 | Ooi | G11B 5/54 |
| | | | | 360/73.03 |
| 9,099,147 | B1 * | 8/2015 | Nicholls | G11B 19/06 |
| 9,171,568 | B1 * | 10/2015 | Nicholls | H02P 6/16 |
| 9,343,102 | B1 * | 5/2016 | Nicholls | H02P 6/182 |
| 9,355,676 | B1 * | 5/2016 | Nicholls | G11B 19/2081 |
| 10,176,840 | B1 * | 1/2019 | Johnson | G11B 19/02 |
| 10,269,385 | B1 * | 4/2019 | French, Jr. | G11B 5/59661 |
| 10,665,255 | B1 * | 5/2020 | Huang | G11B 5/59622 |
| 10,872,629 | B2 * | 12/2020 | Hall | G11B 5/5569 |
| 11,823,710 | B2 * | 11/2023 | Byoun | G11B 25/043 |
| 2002/0029448 | A1 | 3/2002 | Duan et al. | |
| 2005/0185343 | A1 | 8/2005 | Agrawal et al. | |
| 2007/0111645 | A1 | 5/2007 | Hu et al. | |
| 2008/0048595 | A1 * | 2/2008 | Shu | G11B 19/20 |
| | | | | 318/362 |
| 2010/0195243 | A1 | 8/2010 | Zhu et al. | |
| 2016/0012845 | A1 * | 1/2016 | Nicholls | G11B 19/28 |
| | | | | 360/73.03 |

* cited by examiner

START

MOVE ACTUATOR ARM ACROSS DISK SURFACE 82

APPLY ACTIVE BRAKE TO DECELERATE SPINDLE MOTOR BY CONTROLLING DRIVER VOLTAGE TO BE OUT OF PHASE RELATIVE TO BEMF VOLTAGE 84

CONTROL CIRCUITRY 22

HOST 25

SPINDLE MOTOR

VCM

VCM

SPEED CONTROL OF ACTUATOR ARM AND SPINDLE IN A DATA STORAGE DEVICE

BACKGROUND

Data storage devices such as disk drives comprise a magnetic storage medium such as a disk and a recording head connected to a distal end of an actuator arm that is rotated about a pivot by an actuator such as a voice coil motor (VCM) to position the recording head radially at a carefully controlled fly height over the disk. The disk comprises a plurality of radially spaced, concentric tracks for recording user data sectors and servo sectors. The servo sectors comprise head positioning information (e.g., a track address) that is read by the recording head and processed by a servo control system to control the actuator arm as it seeks from track to track. A disk drive typically comprises a plurality of disks each having a top and bottom surface accessed by a respective recording head. The actuator typically rotates a number of actuator arms about a pivot in order to simultaneously position a number of recording heads over respective disk surfaces based on servo data recorded on each disk surface.

FIG. 1 is a conceptual diagram of a conventional disk format 2 comprising a number of servo tracks 4 defined by servo sectors $6_0 \ldots 6_N$ recorded around the circumference of each servo track 4. Each servo sector 6; comprises a pre-amble 8 for storing a periodic pattern that allows proper gain adjustment and timing synchronization of the read signal, and a sync mark 10 for storing a special pattern used to symbol synchronize to a servo data field 12. Servo data field 12 stores coarse head positioning information, such as a servo track address, used to position the head over a target data track during a seek operation. Each servo sector 6; further comprises groups of servo bursts 14 (e.g., N and Q servo bursts) that are recorded with a predetermined phase relative to one another and relative to the servo track centerlines. The phase-based servo bursts 14 provide fine head positioning information used for centerline tracking while accessing a data track during read and write operations. A position error signal (PES) generated by reading servo bursts 14 represents a measured position of the recording head relative to a centerline of a target servo track. A servo controller processes the PES to generate a control signal applied to the actuator to actuate the recording head radially over the disk in a direction that reduces the PES.

The description provided in this background section should not be assumed to be prior art merely because it is mentioned in or associated with this background section. The background section may include information that describes one or more aspects of the subject technology.

SUMMARY

The following summary relates to one or more aspects or embodiments disclosed herein. It is not an extensive overview relating to all contemplated aspects or embodiments, and should not be regarded as identifying key or critical elements of all contemplated aspects or embodiments, or as delineating the scope associated with any particular aspect or embodiment. The following summary has the sole purpose of presenting certain concepts relating to one or more aspects or embodiments disclosed herein in a simplified form to precede the detailed description that follows.

Some aspects of this disclosure are directed to a data storage device comprising a disk; a spindle on which the disk is mounted; a spindle motor configured to rotate the spindle; an actuator arm configured with a recording head; and an actuator configured to rotate the actuator arm about a pivot to move the actuator arm radially across a surface of the disk. Control circuitry is configured to control the actuator to move the actuator arm across the disk surface while simultaneously applying an active brake to decelerate the spindle by controlling a driver voltage of the spindle motor to be out of phase relative to a back electromotive force (BEMF) voltage of the spindle motor.

In some implementations, the control circuitry is further configured to increase a deceleration rate of the spindle by controlling the driver voltage of the spindle motor to be less than the BEMF voltage of the spindle motor.

In some implementations, the control circuitry is further configured to control the deceleration rate of the spindle by manipulating a phase difference and a differential between the driver voltage of the spindle motor and the BEMF voltage of the spindle motor.

In some implementations, the control circuitry is further configured to complete deceleration of the spindle to a low spindle speed before the actuator arm reaches an inner diameter area of the disk surface, as part of a process where the actuator arm is moved radially from an outer diameter area of the disk surface to the inner diameter area of the disk surface at a load velocity.

In some implementations, the control circuitry is further configured to complete deceleration of the spindle to the low spindle speed at about a time that the actuator arm reaches a middle diameter area of the disk surface.

In some implementations, the control circuitry is further configured to regulate the spindle motor to rotate the spindle at the low spindle speed while controlling the actuator to move the actuator arm from the middle diameter area of the disk surface to the inner diameter area of the disk surface.

In some implementations, when the actuator arm reaches the inner diameter area of the disk surface, the control circuitry is further configured to control the actuator to move the actuator arm from the inner diameter area of the disk surface to the outer diameter area of the disk surface at a park velocity that is greater than the load velocity while regulating the spindle motor to rotate the spindle at the low spindle speed.

In some implementations, the control circuitry is further configured to perform a burnishing process while controlling the actuator to move the actuator arm across the disk surface while simultaneously applying the active brake to decelerate the spindle to the low spindle speed.

In some implementations, the burnishing process is an in-field repair step triggered when a logged parameter of the data storage device reaches a threshold.

Other aspects of this disclosure are directed to control circuitry for controlling an actuator arm and a spindle of a data storage device. An arm control circuit is configured to control an actuator to move the actuator arm across a disk surface. A spindle control circuit is configured to, simultaneously with the arm control circuit controlling the actuator to move the actuator arm across the disk surface, apply an active brake to decelerate the spindle by controlling a driver voltage of a spindle motor to be out of phase relative to a BEMF voltage of the spindle motor.

Further aspects of this disclosure are directed to a method for controlling an actuator arm and a spindle of a data storage device. The method comprises controlling an actuator to move the actuator arm across a disk surface, and simultaneously with moving the actuator arm across the disk surface, applying an active brake to decelerate the spindle by controlling a driver voltage of a spindle motor to be out of phase relative to a BEMF voltage of the spindle motor.

Various additional aspects of this disclosure are described below and depicted in the accompanying figures and will be further apparent based thereon.

BRIEF DESCRIPTION OF THE DRAWINGS

Various features and advantages of this disclosure will be apparent from the following description and accompanying drawings. The drawings are not necessarily to scale; emphasis instead is placed on illustrating the principles of this disclosure. In the drawings, like reference characters may refer to the same parts throughout the different views. The drawings depict only illustrative examples of this disclosure and are not limiting in scope.

DETAILED DESCRIPTION

The words "exemplary" and "example" as used herein mean "serving as an example, instance, or illustration." Any embodiment described herein as "exemplary" or as an "example" should not be construed as preferred or advantageous over other embodiments.

The embodiments described herein do not limit the invention to the precise form disclosed, nor are they exhaustive. Rather, various embodiments are presented to provide a description for utilization by others skilled in the art. Technology continues to develop, and elements of the disclosed embodiments may be replaced by improved and enhanced items. This disclosure inherently discloses elements incorporating technology available at the time of this disclosure.

Figure 1:
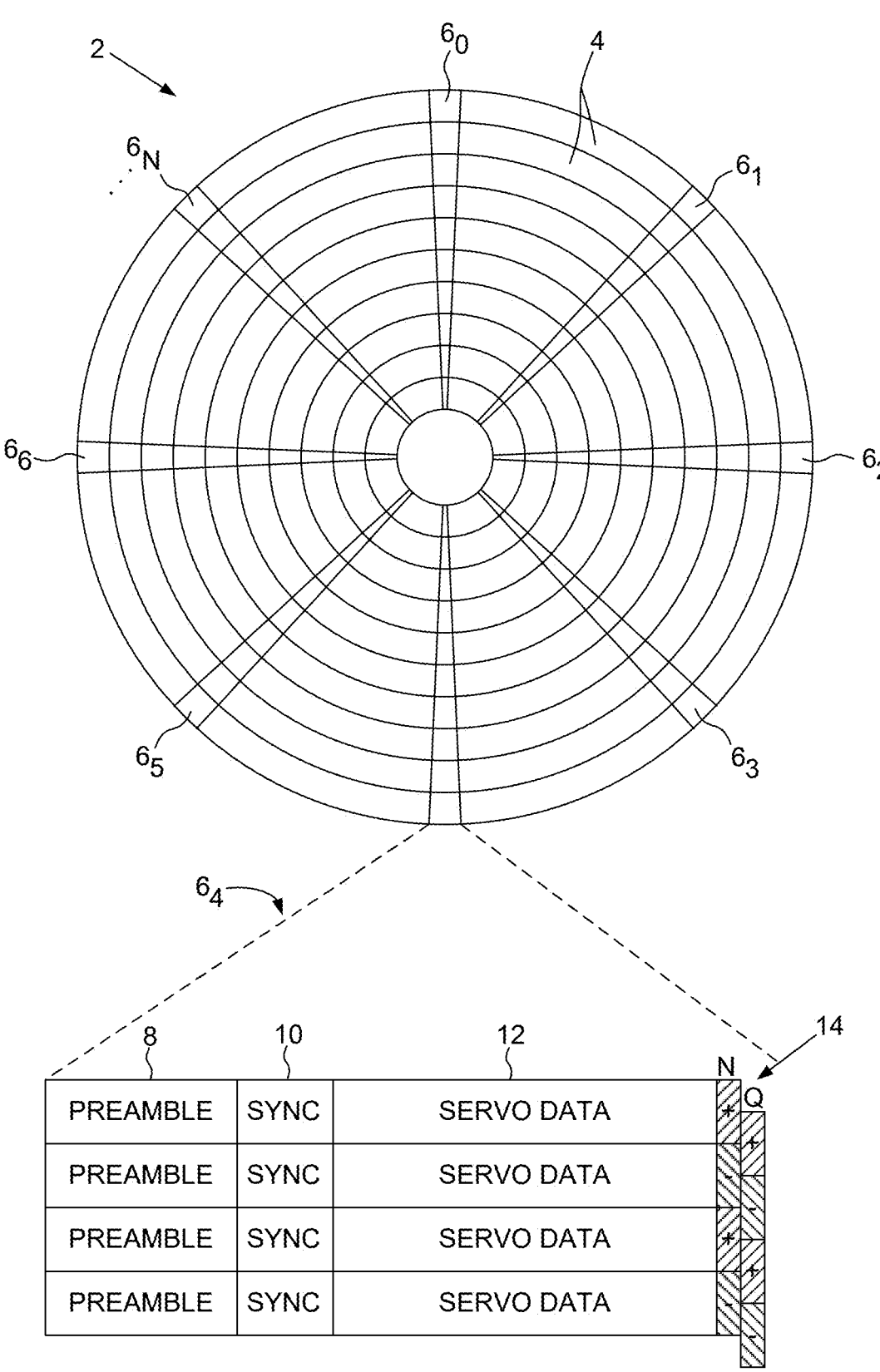
FIG. 1 is a conceptual diagram of a conventional disk format, in accordance with aspects of this disclosure.
Figures 2A, 2B, 2C:
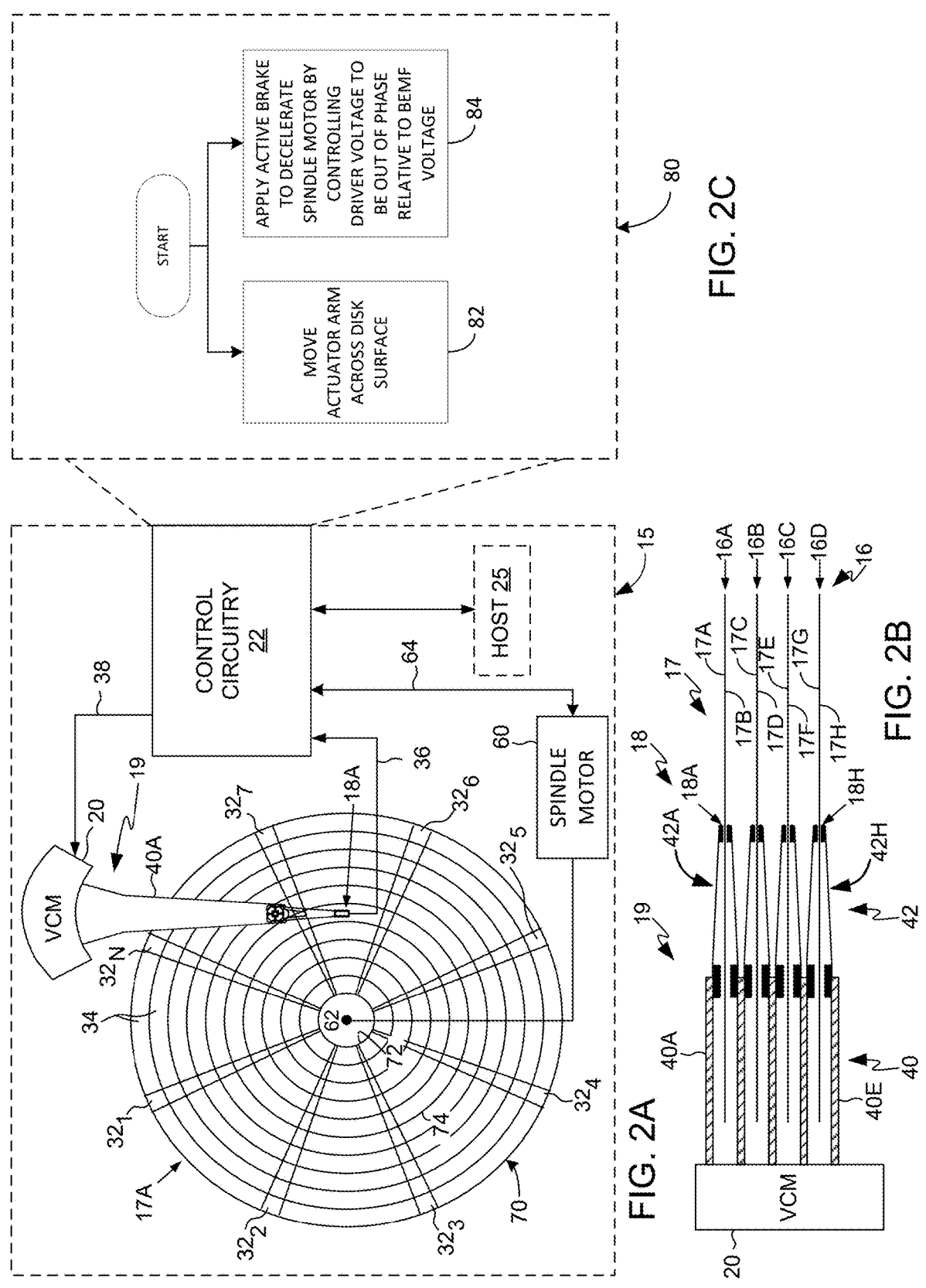
FIG. 2A is a conceptual diagram of a top view of a data storage device in the form of a hard disk drive (HDD), in accordance with aspects of this disclosure.
FIG. 2B is a conceptual diagram of a side view of a data storage device in the form of an HDD, in accordance with aspects of this disclosure.
FIG. 2C is a flow diagram illustrating a method for controlling an actuator arm and a spindle that control circuitry of a data storage device may perform, in accordance with aspects of this disclosure.

While a data storage device in the form of a disk drive with rotating magnetic storage media is primarily referred to in the examples discussed herein, the data storage device may instead comprise or additionally include other types of non-volatile storage media, such as magnetic tape media, optical media, etc. FIGS. 2A and 2B are conceptual top and side views of a data storage device in the form of hard disk drive (HDD) 15, in accordance with aspects of this disclosure. HDD 15 comprises recording heads 18 (e.g., recording heads 18A . . . 18H) that are actuated over surfaces 17 (e.g., surfaces 17A . . . 17H) of magnetic storage media 16 (e.g., disks 16A . . . 16D) by actuator assembly 19. Data storage device 15 further comprises spindle motor 60 configured to spin or rotate a spindle 62 on which disks 16 are mounted.

Referring to FIG. 2A, top surface 17A of disk 16A comprises a plurality of servo sectors 32 (e.g., servo sectors 321 . . . 32N) that define a plurality of servo tracks, wherein data tracks 34 are defined relative to the servo tracks at the same or a different radial density. Control circuitry 22 processes read signal 36 emanating from recording head 18A to demodulate the servo sectors and generate a position error signal (PES) representing an error between the actual position of recording head 18A and a target position relative to a target track. A servo control system in control circuitry 22 filters the PES using a suitable compensation filter to generate control signal 38 that is applied to actuator (VCM) 20. Actuator 20, in turn, rotates actuator arm 40A about a pivot to actuate or move actuator arm 40A and recording head 18A radially over disk surface 17A in a direction that reduces the PES. In some examples, recording head 18A may be actuated over disk surface 17A using one or more secondary actuators, such as a microactuator that actuates a suspension coupling a head slider to actuator arm 40A, or a microactuator that actuates the head slider relative to the suspension (e.g., a thermal actuator, a piezoelectric actuator, etc.). Control circuitry 22 further generates control signal 64 that is applied to spindle motor 60 to control the operation and speed of spindle motor 60, and in turn the spindle speed at which disk 16 is spun.

Servo sectors 32 comprise suitable head positioning information, such as a track address for coarse positioning and servo bursts for fine positioning. In particular, each servo sector 32 may include a phase lock loop (PLL) field, a servo sync mark (SSM) field, a track identification (TKID) field, a sector ID, and a group of servo bursts (an alternating pattern of magnetic transitions) for fine positioning of recording head 18A relative to a particular track 34. The servo bursts may comprise any suitable pattern, such as an amplitude-based servo pattern or a phase-based servo pattern.

FIG. 2A further illustrates that disk surface 17A extends radially between an outer diameter area 70 and an inner diameter area 72. Outer diameter area 70 may include an outer diameter crash stop (ODCS) and a ramp for parking actuator arm 40 and recording head 18 when not loaded onto disk surface 17A. Inner diameter area 72 may include an inner diameter crash stop (IDCS). Disk surface 17A further comprises a middle diameter area 74 that is approximately radially midway between outer diameter area 70 and inner diameter area 72.

As shown in FIG. 2B, actuator assembly 19 comprises primary actuator 20, which is typically a voice coil motor (VCM), and a number of actuator arms 40 (e.g., actuator arms 40A . . . 40E). Recording heads 18 are configured at distal ends of actuator arms 40 via suspensions 42 (e.g., suspensions 42A . . . 42H). Each suspension 42 is configured to suspend a recording head 18 in close proximity over a corresponding disk surface 17. For example, recording head 18A is suspended by topmost actuator arm 40A via suspension 42A over topmost disk surface 17A, and recording head 18H is suspended by lowest actuator arm 40H via suspension 42H over lowest disk surface 17H. Recording heads 18 comprise read and write elements configured for reading and writing control features and data from and to disk surfaces 17. FIGS. 2A-2B are presented for exemplary purposes only; a wide variety of other numbers of disks, disk surfaces, actuators, actuator assemblies, suspensions, and recording heads are contemplated and may be used.

Host 25 generates access commands for reading data from and writing data to HDD 15. Host 25 may be a computing device such as a desktop computer, laptop, server, mobile computing device (e.g., smartphone, tablet, etc.), or any other suitable computing device. In some examples, host 25 may be a test computer that performs calibration and testing functions as part of the HDD manufacturing process.

Control circuitry 22 is further configured to implement method 80 of FIG. 2C for controlling actuator arm 40 and spindle 62 of data storage device 15, in accordance with aspects of this disclosure. Control circuitry 22 may comprise an arm control circuit for controlling actuator 20 and actuator arm 40 and a spindle control circuit for controlling spindle motor 60 and spindle 62. Method 80 may also be referred to as an active braking dual RPM (ABDR) process. In step 82, actuator arm 40 with recording head 18 configured thereon is moved across disk surface 17. In step 84, while simultaneously moving actuator arm 40 across disk surface 17, an active brake is applied to decelerate spindle 62 by controlling a driver voltage of spindle motor 60 to be out of phase relative to a back electromotive force (BEMF) voltage of spindle motor 60.

In some non-limiting examples, method 80 for controlling actuator arm 40 and spindle 62 of data storage device 15 may be effective to perform a burnishing process for removing debris, such as dust and other particulates, from data storage device 15. In a burnishing process, an actuator arm with a recording head configured thereon is moved over a disk surface as it is rotated or spun by the spindle motor to disperse dust and other particles, which are captured by a filter package inside the data storage device. A burnishing process implemented by control circuitry 22 and/or method 80 may be performed in the field as part of a recovery process, for example. In some examples, method 80 implements a low spindle speed burnishing process as an in-field repair step, particularly for contamination related failures. The in-field repair step may be triggered by failure modes in which a logged parameter of the data storage device reaches a threshold.

As described above, the disks of a data storage device are rotated or spun by virtue of being mounted on a spindle that is rotated or spun by a spindle motor. In some examples, during a process such as burnishing, the spindle is first accelerated in a closed loop to a high spindle speed, such that the heads can be safely loaded from the outer diameter area loading ramp to the inner diameter area of the disk surface at a fly height sufficient to prevent head slap (head contact with the disc surface when the heads come off the loading ramp). Once the heads are loaded onto the inner diameter area of the disk surface, the spindle is then decelerated in a closed loop until a low spindle speed is reached. At the low spindle speed, the fly height is low enough for the heads to perform a process such as burnishing but high enough to avoid head drag. Deceleration from the high spindle speed to the low spindle speed is typically accomplished by programming a target speed of the spindle motor to gradually decrease through many iterations or steps. Acceleration is handled in like fashion, with the target speed of the spindle motor gradually increasing through many iterations or steps. In general, closed loop acceleration and deceleration are governed by the design bandwidth, which is typically about 5 Hz.

Figure 3:
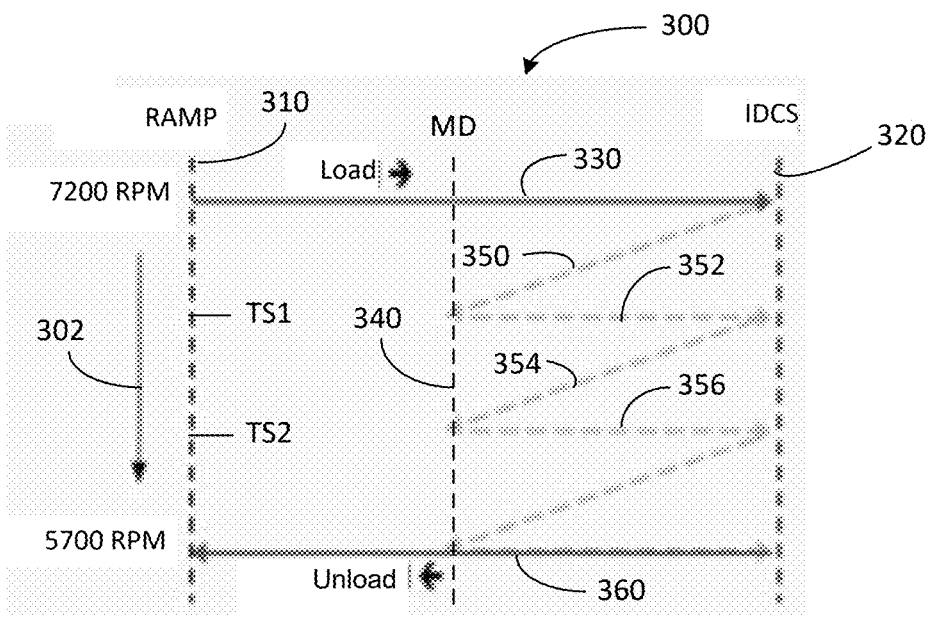
FIG. 3 is a diagram conceptually illustrating a method for closed loop deceleration of a spindle motor, in accordance with aspects of this disclosure.

FIG. 3 is a diagram 300 that conceptually illustrates a method for closed loop deceleration of a spindle motor, in accordance with aspects of this disclosure. The process of FIG. 3 may also be referred to as a dual RPM load/unload (L/UL) process. As indicated by downwardly-pointing arrow 302, spindle speed is reduced by decelerating the spindle motor in a closed loop from a high spindle speed (in some examples, about 7200 revolutions per minute (RPM)) to a low spindle speed (in some examples, about 5700 RPM). This is accomplished in step-wise fashion by decelerating the spindle motor through multiple target speeds until the low spindle speed is reached. In particular, and as described in more detail with reference to FIG. 4A, a driver voltage applied to the spindle motor is decreased until the speed of the motor reaches a target speed. This process is repeated through multiple and progressively lower target speeds until the low spindle speed is reached.

As depicted by line 330, the recording heads are initially loaded onto the disk surface by moving the actuator arm across the disk surface from ramp 310 in the outer diameter area to inner diameter crash stop (IDCS) 320 as the disk is spinning at the high spindle speed of 7200 RPM. Once the heads have reached IDCS 320, the spindle is decelerated to a first target speed TS1 by suitably lowering a driver voltage applied to the spindle motor. In a process such as burnishing, as indicated by line 350, the recording heads may be moved across the disk by moving the actuator arm from IDCS 320 towards the middle diameter (MD) area 340 of the disk surface as the spindle decelerates toward first target speed TS1. As indicated by line 352, when the spindle reaches first target speed TS1, the recording heads are moved back across the disk surface in the reverse direction by pulling the actuator arm back to IDCS 320. Moving the actuator arm and recording heads across the disk surface from IDCS 320 to MD area 340 as the spindle decelerates to a target speed, and then pulling the actuator arm and recording heads back from MD area 340 to IDCS 320 when the target speed is reached, is effective to perform burnishing.

Once the recording heads have been pulled back to IDCS 320, the target speed is changed from first target speed TS1 to an incrementally lower second target speed TS2, and the spindle is decelerated to second target speed TS2 by further lowering the driver voltage applied to the spindle motor. As indicated by line 354, as the spindle decelerates toward second target speed TS2, the recording heads are again moved across the disk surface by moving the actuator arm from IDCS 320 towards MD area 340. As indicated by line 356, when the spindle reaches second target speed TS2, the recording heads are then moved back across the disk surface in the reverse direction by pulling the actuator arm back to IDCS 320. Another burnishing cycle is thereby performed. This incremental reduction of the spindle speed to a target speed while the actuator arm and recording heads are moved across the disk surface, followed by pulling the actuator arm and recording heads back to IDCS 320 when the target speed is reached, is repeated until the spindle has decelerated to the low spindle speed (in some examples, about 5700 RPM); at which time the heads and arm are unloaded to the outer diameter ramp (parked) at the low spindle speed (line 360).

While the example of FIG. 3 shows incremental deceleration through only two target speeds TS1 and TS2, this is for sake of simplified illustration only. In typical use, the spindle speed is incrementally decelerated through many more than two target speeds. As merely one non-limiting example, and referring to FIG. 3, the spindle may be incrementally decelerated from the high spindle speed of about 7200 RPM to a target speed of about 7100 RPM, and then to a target speed of about 7000 RPM, and then to a target speed of about 6900 RPM, and so on, until the low spindle speed of 5700 RPM is reached. The example dual RPM load/unload (L/UL) process of FIG. 3 minimizes risk for head wear by loading at a high spindle speed and provides burnishing opportunity by unloading at a low spindle speed. However, the many iterations required to progressively lower the driver voltage to incrementally decelerate the spindle motor speed through target speeds from the high spindle speed to the low spindle speed results in a very lengthy processing time.

An active brake dual RPM (ABDR) process in accordance with aspects of this disclosure is now described. For sake of simplified description, the ABDR process is described in singular terms such as a recording head 18, an actuator arm 40, a disk 16, a disk surface 17, and so on. However, as described above with reference to FIGS. 2A-2C, data storage device 15 may comprise a stack of disks 16 providing multiple disk surfaces 17 that are accessed by an actuator assembly 19 comprising multiple recording heads 18 configured on multiple actuator arms 40. Accordingly, the ABDR process described herein may be concurrently executed by the multiple recording heads 18, actuator arms 40, disks 16, and disk surfaces 17 that may be present in data storage device 15.

According to aspects of this disclosure, rather than progressing through incrementally lower target speeds by incrementally decreasing the driver voltage of spindle motor 60, a spindle active brake is instead applied to shorten the process time required to decelerate spindle motor 60. The spindle active brake is able to decelerate spindle motor 60 must faster than by progressively reducing target speeds in a closed loop, as described with reference to FIG. 3. In particular, and referring again to method 80 of FIG. 2C, actuator arm 40 with recording head 18 configured thereon is moved across disk surface 17 (step 82). Simultaneously with moving actuator arm 40 across disk surface 17, a spindle active brake is applied to spindle motor 60 to decelerate spindle 62. Processes for decelerating the spindle motor as the actuator arm sweeps across the disk, such as the closed loop deceleration example of FIG. 3, do not apply an active brake to reduce the speed of the spindle motor, and do not perform simultaneous and dual control of the actuator arm and spindle motor in the manner described herein. Through use of an active brake to decelerate the spindle motor and simultaneous and dual control of the actuator arm, processing time is reduced by as much as four times in the factory, which significantly reduces total manufacturing cost.

Figure 4A:
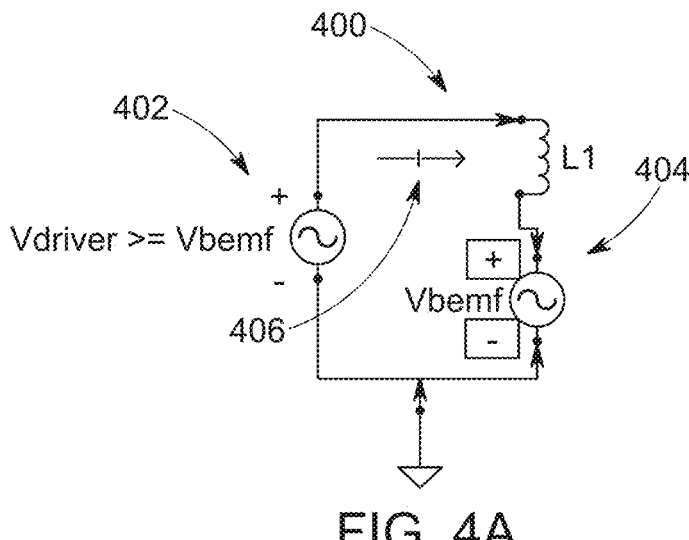
FIG. 4A is a circuit diagram of a typical configuration for driving a spindle motor, in accordance with aspects of this disclosure.
Figure 4B:
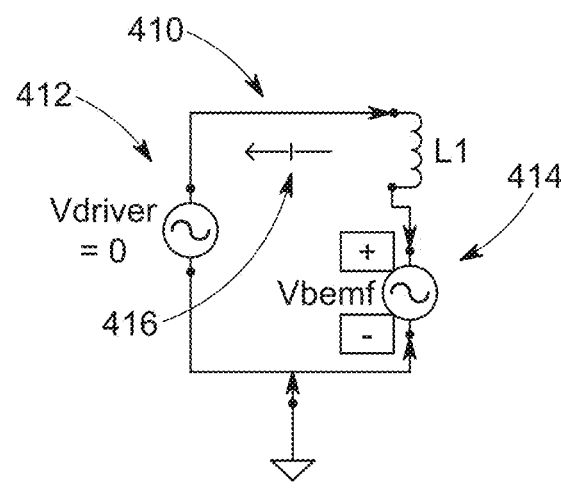
FIG. 4B is a circuit diagram showing a dynamic brake configuration for decelerating a spindle motor, in accordance with aspects of this disclosure.
Figure 4C:
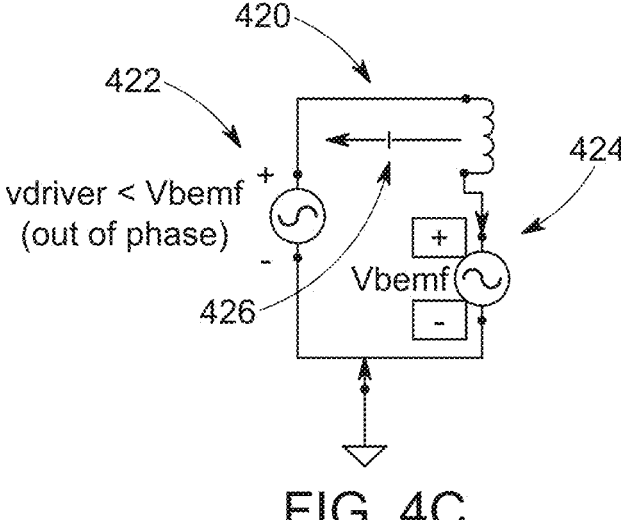
FIG. 4C is a circuit diagram showing an active brake configuration for decelerating a spindle motor, in accordance with aspects of this disclosure.

FIGS. 4A-4C are presented to explain operation of the spindle active brake. FIG. 4A is a circuit diagram 400 showing a typical configuration for driving a spindle motor. Circuit 400 comprises driver voltage supply 402 that applies a driver voltage Vdriver to spindle motor 404. Spindle motor 404 is represented as an inductor L1 in series with back electromotive force (BEMF) voltage Vbemf. For simplicity, the motor resistance is omitted in FIGS. 4A-4C. Application of driver voltage Vdriver across spindle motor 404 causes current 406 to flow through the windings of spindle motor 404, resulting in rotational motion of spindle motor 404. Inductor L1 represents the windings of spindle motor 404, which have inductance due to the windings being wrapped around the armature of spindle motor 404. When the armature of spindle motor 404 turns within its stator, a BEMF voltage Vbemf is generated that opposes the driver voltage Vdriver, effectively reducing the net voltage across spindle motor 404, the current flowing through spindle motor 404, and ultimately the speed of spindle motor 404. So long as Vdriver is greater than Vbemf, a net current 406 flows into spindle motor 404. Thus, as discussed with reference to FIG. 3, the speed of spindle motor 404 can be decreased to a lower target speed by reducing the driver voltage Vdriver. Likewise, the speed of spindle motor 404 can be increased to a higher target speed by increasing the driver voltage Vdriver.

FIG. 4B is a circuit diagram 410 showing a "dynamic brake" configuration, in which driver voltage supply 412 is shorted or set to zero to brake spindle motor 414. The motor's rotational energy keeps the spindle moving and an opposing BEMF voltage Vbemf is generated. An uncontrolled current 416 flowing out of spindle motor 414 in the opposite direction relative to current 406 of FIG. 4A is driven by the BEMF voltage, effectively draining current from spindle motor 414 until rotational motion of spindle motor 414 ceases or is significantly reduced. Current 416 is characterized as uncontrolled because it is primarily governed by the residual speed of spindle motor 414 rather than by an external control mechanism or feedback system.

FIG. 4C is a circuit diagram 420 illustrating a spindle active brake configuration for decelerating a spindle motor 424, in accordance with aspects of this disclosure. The spindle active brake configuration of FIG. 4C is controlled by control circuitry 22 (or by a spindle control circuit of control circuitry 22) to apply the active brake. In particular, instead of setting driver voltage 422 to zero, as in the dynamic brake configuration of FIG. 4B, control circuitry 22 controls driver voltage 422 to be out of phase relative to the BEMF voltage of spindle motor 424, such that the driver voltage deliberately opposes the BEMF voltage. This out-of-phase relationship reduces the net opposing voltage from the BEMF by counteracting it, allowing more current 426 to be drawn from spindle motor 424. As a result, the energy of spindle motor 424 decreases and spindle motor 424 slows down. Current 426 is characterized as "controlled" because braking force is regulated by controlling the amount of current drawn from spindle motor 424. Control circuitry 22 may set the driver voltage to be less than the BEMF voltage (Vdriver<Vbemf) to enhance the active braking effect by creating a larger differential between the BEMF voltage and the driver voltage. That is, control circuitry 22 may set the driver voltage to be less than the BEMF voltage to increase the deceleration rate of spindle motor 424. When the driver voltage is less than the BEMF voltage, spindle motor 424 effectively operates in a generator mode, with the BEMF driving current 426 in the direction that opposes rotation of spindle motor 424. This reverse current flow is increased due to the BEMF exceeding the driver voltage, leading to more significant energy extraction from spindle motor 424. The greater the difference between the BEMF and driver voltage, the more pronounced the reverse current flow becomes, leading to more rapid deceleration of motor 424. By manipulating the phase difference and the differential between the driver and BEMF voltages, the deceleration rate of spindle motor 424 can be precisely controlled.

Figure 5:
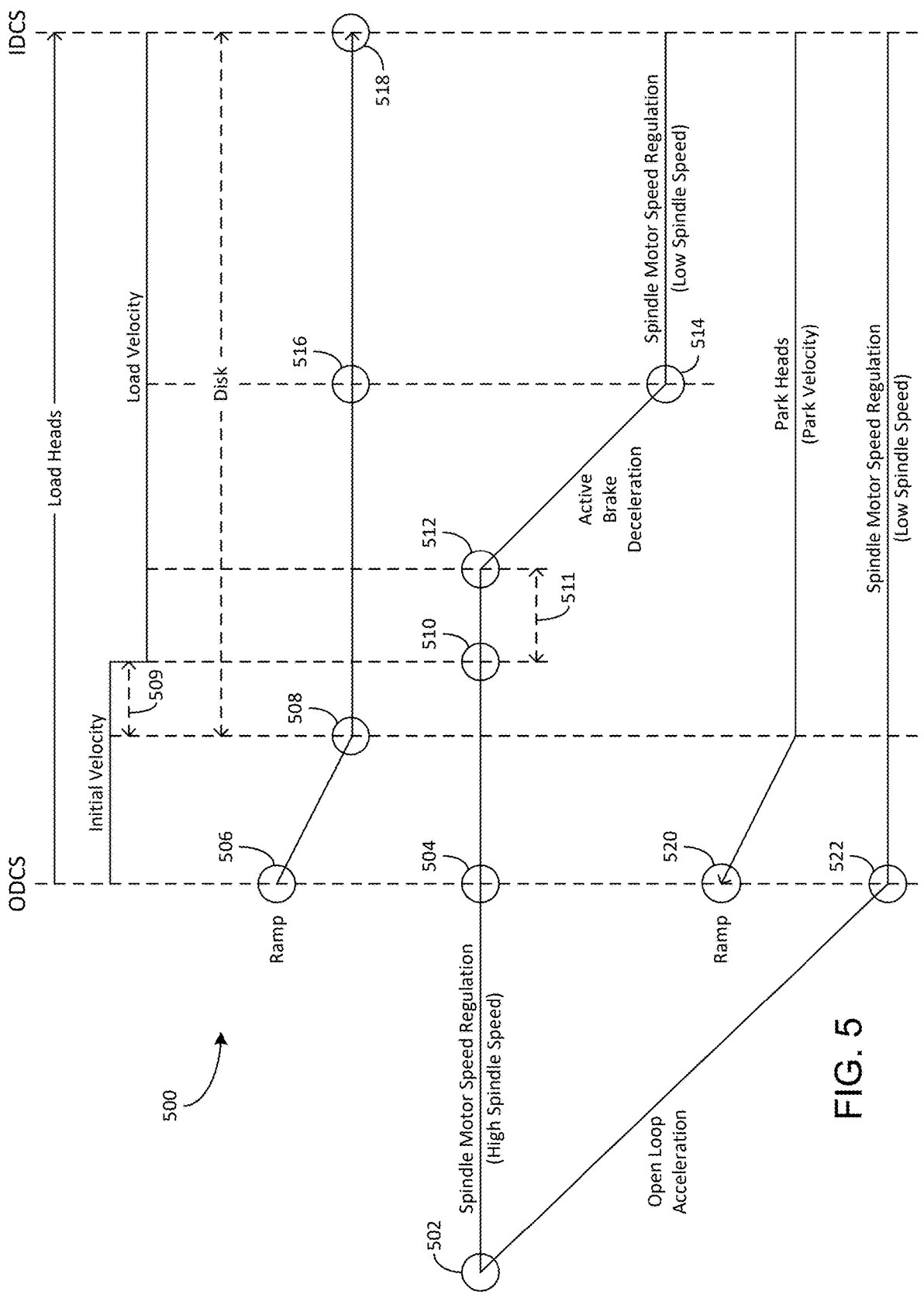
FIG. 5 is a diagram illustrating the method of FIG. 2C in more detail, in accordance with aspects of this disclosure.

FIG. 5 is a diagram 500 illustrating the actuator arm and spindle control method of FIG. 2C in more detail, in accordance with aspects of this disclosure. To begin, spindle 62 may optionally be initially spun up to a standard speed by spindle motor 60. The standard speed may vary depending on the particular disk drive implementation and application. In one non-limiting example, the initial standard speed may be about 7834 RPM. As indicated at 502, spindle 62 is then decelerated from the standard speed to a high spindle speed. The high spindle speed is programmable and may vary depending on the particular disk drive implementation and application, and should be sufficiently high to avoid head slap when actuator arm 40 and recording head 18 are loaded onto disk surface 17. In one non-limiting example, the high spindle speed is about 5000 RPM.

Once spindle motor 60 has reached the high spindle speed, it is regulated at the high spindle speed (as indicated at 504) while actuator arm 40 and recording head 18 are loaded from the loading ramp onto disk surface 17 (as indicated at 506). Actuator arm 40 is loaded from the ramp onto disk surface 17 at an initial velocity. The initial velocity is programmable and may vary depending on the particular disk drive implementation and application, but should be high enough to prevent head slap during loading. In one non-limiting example, the initial velocity is about 2.5 inches per second (IPS). When actuator arm 40 (with recording head 18 configured thereon) comes off the ramp, media detection occurs when the actuator (VCM) load current exceeds a predetermined current threshold, as indicated at 508. After media detection, there may be an optional first delay 509 to account for transients as actuator arm 40 loads onto disk surface 17. First delay 509 is programmable and may vary depending on the particular disk drive implementation and application. In one non-limiting example, first delay 509 is about 20 ms. Once first delay 509 has elapsed, as indicated at 510, actuator arm 40 is decelerated from the initial velocity to a load velocity. The load velocity is programmable and may vary depending on the particular disk drive implementation and application. In a burnishing application, the load velocity should be less than the initial velocity to increase friction and effectively perform burnishing. In one non-limiting example, the load velocity is about 0.6 IPS.

The spindle motor speed remains or is regulated at the high spindle speed until actuator arm 40 has decelerated to the load velocity. Once actuator arm 40 has decelerated to the load velocity, in order to avoid changing the spindle motor speed and the actuator arm velocity at the same time, an optional second delay 511 may be asserted before decelerating spindle motor 60. Second delay 511 is programmable and may vary depending on the particular disk drive implementation and application. In one non-limiting example, second delay 511 is about 50 ms. Once second delay 511 has elapsed, as indicated at 512, a spindle active brake is applied to begin decelerating spindle motor 60 to a low spindle speed. The low spindle speed is programmable and may vary depending on the particular disk drive implementation and application. In one non-limiting example, the low spindle speed is about 4300 RPM.

The spindle active brake configuration of FIG. 4C may be applied to decelerate spindle motor 60 from the high spindle speed to the low spindle speed. In particular, the driver voltage of voltage supply 422 is set to be out of phase relative to the BEMF voltage of spindle motor 424, such that the applied voltage deliberately opposes the BEMF voltage. This out-of-phase relationship reduces the net opposing voltage from the BEMF by counteracting it, allowing more current 426 to be drawn from spindle motor 424. As a result, the energy of spindle motor 424 decreases and spindle motor 424 slows down. Current 426 is characterized as "controlled" because braking force is regulated by controlling the amount of current drawn from spindle motor 424. Setting the driver voltage to be less than the BEMF voltage (Vdriver<Vbemf) enhances the active braking effect by creating a larger differential between the BEMF and the driver voltage. When the driver voltage is less than the BEMF voltage, spindle motor 424 effectively operates in a generator mode, with the BEMF voltage driving current 426 in the direction that opposes rotation of spindle motor 424. This reverse current flow is increased due to the BEMF voltage exceeding the driver voltage, leading to more significant energy extraction from spindle motor 424. The greater the difference between the BEMF voltage and the driver voltage, the more pronounced the reverse current flow becomes, leading to more rapid deceleration of spindle motor 424. By manipulation of the phase difference and the differential between the driver and BEMF voltages, more rapid and controlled deceleration of spindle motor 424 is possible.

As spindle motor 60 is decelerated by the active brake of FIG. 4C, actuator arm 40 simultaneously moves radially across disk surface 17 towards inner diameter area 72 of disk surface 17 at the load velocity. In some examples, control circuitry 22 for actuator arm 40 and spindle motor 60 is incorporated into a power large scale integration (PLSI) device, which allows for more sophisticated and faster-acting active braking control. In one example, deceleration of spindle motor 60 is timed such that spindle motor 60 reaches the low spindle speed (as indicated at 514) at about a same time that actuator arm 40 reaches middle diameter area 74 of disk surface 17.

Once spindle motor 60 has reached the low spindle speed, as indicated at 514, the spindle motor speed is regulated (maintained) at the low spindle speed as actuator arm 40 continues moving radially at the load velocity from middle diameter area 74 (as indicated at 516) to inner diameter area 72 of disk surface 17 (as indicated at 518). In a burnishing application, for example, regulation of spindle motor 60 at the low spindle speed allows burnishing to be safely performed without head drag. Once actuator arm 40 reaches inner diameter area 72 (as indicated at 518), it is reversed and moves at a park velocity towards outer diameter area 70 of disk surface 17 to be parked on the loading ramp, as indicated at 520. The park velocity is programmable and may vary depending on the particular disk drive implementation and application. In one non-limiting example, the park velocity is about 6 IPS. As actuator arm 40 and recording head 18 are being parked (moved from inner diameter area 72 to outer diameter area 70 at the park velocity), the spindle motor speed is regulated at the low spindle speed. Thus, in a burnishing application, even as actuator arm 40 is being parked, burnishing takes place. Adjustment of the park velocity downward may further enhance burnishing by increasing friction.

Once actuator arm 40 is at outer diameter area 70 and parked, as indicated at 520, spindle motor 60 is accelerated from the low spindle speed at 522 back to the high spindle speed at 502, and is then regulated to remain at the high spindle speed. In some examples, spindle motor 60 is accelerated by open loop acceleration to the high spindle speed, meaning that acceleration is initiated without feedback control and based solely on input from the spindle motor digital to analog converter (DAC). At this point, one iteration of the ABDR process is complete. Additional iterations may be repeated if needed. In a burnishing application, for example, the process of FIG. 5 may be repeated multiple times per head. In one non-limiting example, the ABDR process of FIG. 5 is repeated five times per head.

Figure 6:
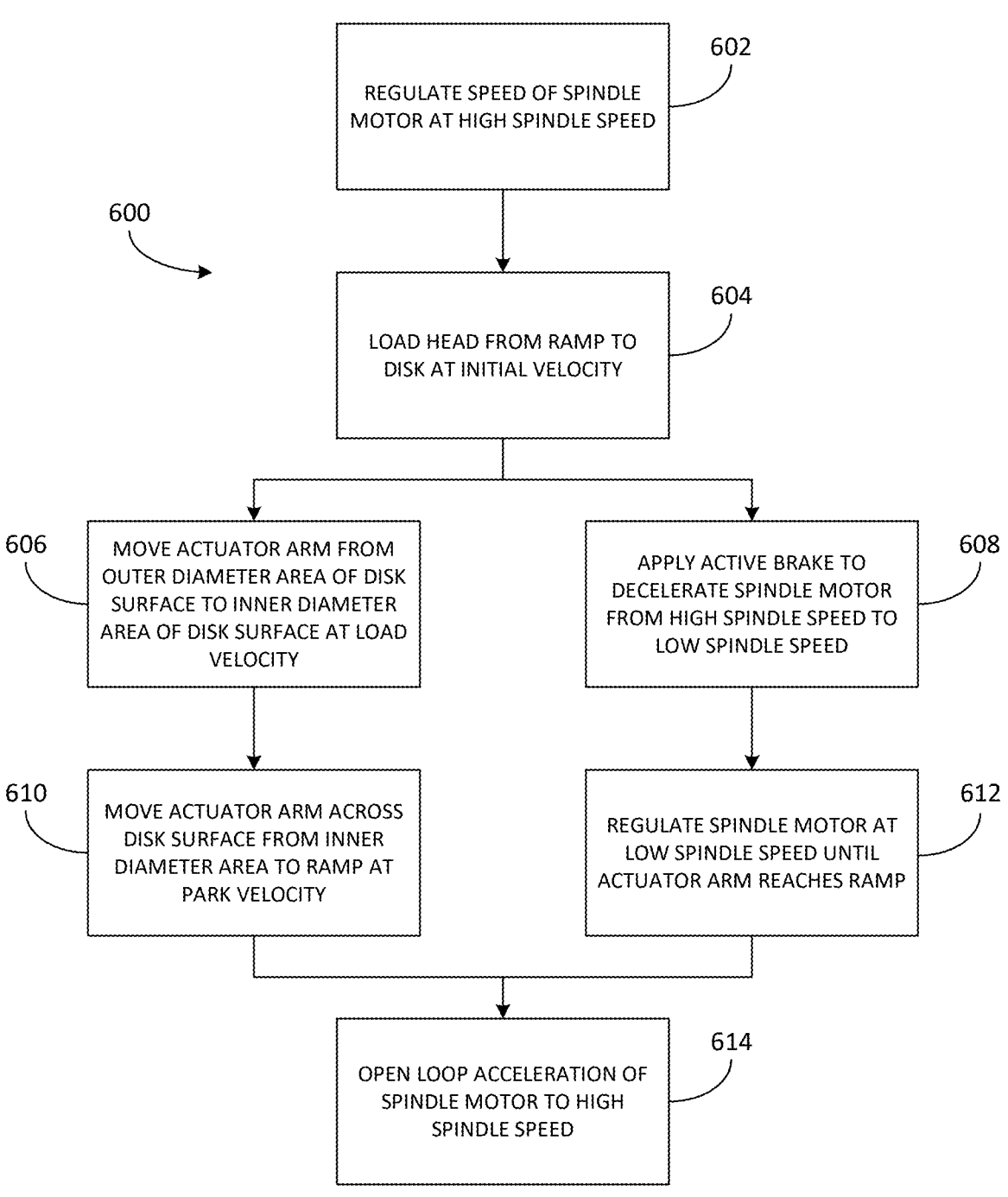
FIG. 6 is a flow diagram of the ABDR process of FIG. 5, in accordance with aspects of this disclosure.

FIG. 6 is a flow diagram 600 of the ABDR process of FIG. 5, in accordance with aspects of this disclosure. Flow diagram 600 provides a more detailed and expanded description of method 80 of FIG. 2C. In step 602, the speed of spindle motor 60 is regulated at the high spindle speed. The high spindle speed should be sufficiently high to avoid head slap as actuator arm 40 with recording head 18 configured thereon are loading onto disk surface 17, and in one non-limiting example is about 5000 RPM. In some examples, step 602 includes first spinning spindle motor 60 up to a standard speed that may vary depending on the particular disk drive implementation and application. In one non-limiting example, the standard speed is about 7834 RPM. Next, also as part of step 602, spindle motor 60 is decelerated from the standard speed down to and regulated at the high spindle speed. In step 604, while the speed of spindle motor 60 is regulated at the high spindle speed, actuator arm 40 is loaded from the loading ramp to outer diameter area 70 of disk surface 17 at an initial velocity that is high enough to prevent head slap. In one non-limiting example, the initial velocity is about 2.5 IPS. When actuator arm 40 comes off the ramp, media detection occurs when the load current of actuator (VCM) 20 exceeds a predetermined current threshold.

Once actuator arm 40 is loaded to outer diameter area 70 of disk surface 17 in step 604, it is then moved (under the control of actuator 20) in step 606 across disk surface 17 to inner diameter area 72 at a programmable load velocity. In a burnishing application, for example, the load velocity may be less than the initial velocity to increase friction and effectively perform burnishing. The load velocity may be about 0.6 IPS, for example. Step 606 may optionally include a first programmable delay before deceleration from the initial velocity to the load velocity to account for any transients as actuator arm 40 loads onto disk surface 17. In one non-limiting example, the first delay is about 20 ms. Once the first delay has elapsed, actuator arm 40 is decelerated from the initial velocity to the load velocity.

Simultaneous with moving actuator arm 40 at the load velocity radially across disk surface 17 in step 606, an active brake is applied in step 608 to decelerate spindle motor 60 from the high spindle speed to the low spindle speed. The low spindle speed is programmable and in one non-limiting example is about 4300 RPM. Step 608 may optionally include a second programmable delay that is asserted after actuator arm 40 has decelerated to the load velocity and before application of the active brake to avoid changing the spindle speed and the actuator arm velocity at the same time. In one non-limiting example, the second delay is about 50 ms. Once the second delay has elapsed, the spindle active brake is applied to begin decelerating spindle motor 60 to the low spindle speed.

As described above, the spindle active brake configuration of FIG. 4C may be applied to decelerate spindle motor 60 from the high spindle speed to the low spindle speed. In particular, control circuitry 22 controls the driver voltage of spindle motor 60 to be out of phase relative to the BEMF voltage of spindle motor 60. The deceleration rate of spindle 62 may be increased by controlling the driver voltage of spindle motor 60 to be less than the BEMF voltage of spindle motor 60. Control circuitry 22 may thereby control the deceleration rate of spindle 62 by manipulating a phase difference and a differential between the driver voltage of spindle motor 60 and the BEMF voltage of spindle motor 60.

As spindle motor 60 is decelerated by the active brake of FIG. 4C in step 608, actuator arm 40 is simultaneously moved across disk surface 17 towards inner diameter area 72 at the load velocity in step 606. In some examples, control circuitry 22 for actuator arm 40 and spindle motor 60 is incorporated into a power large scale integration (PLSI) device, which allows for more sophisticated and faster-acting active braking control. In one example, deceleration of spindle motor 60 is timed such that spindle motor 60 reaches the low spindle speed just as actuator arm reaches middle diameter area 74 of disk surface 17. Once spindle motor 60 has reached the low spindle speed, it is regulated at the low spindle speed as actuator arm 40 continues moving from middle diameter area 74 to inner diameter area 72 of disk surface 17. In a burnishing application, regulation of spindle motor 60 at the low spindle speed allows burnishing to be safely performed without head drag.

In step 610, once actuator arm 40 reaches inner diameter area 72, it is moved in a reverse direction at a programmable park velocity towards outer diameter area 70 to be parked on the loading ramp. In one non-limiting example, the park velocity is about 6 IPS. Simultaneously, in step 612, the spindle motor speed is regulated at the low spindle speed until actuator arm 40 is parked on the ramp. Thus, in a burnishing application, even as actuator arm 40 is being parked, burnishing takes place. Adjustment of the park velocity downward may further enhance burnishing by increasing friction.

In step 614, once actuator arm 40 is parked and is at rest on the ramp, spindle motor 60 may be accelerated by open loop acceleration from the low spindle speed back to the high spindle speed. In order to optimize for acceleration, step 614 may set a limit on the current that can be supplied to spindle motor 60. This is a protective measure to prevent the power supply (power supply 422 of FIG. 4C, for example) from exceeding its maximum current capability, which could overload or damage the power supply or spindle motor 60. In addition, in step 614, the digital-to-analog (DAC) converter of spindle motor 60 may be set to a maximum or high value to activate open loop acceleration to the high spindle speed. Open loop acceleration means that the acceleration is initiated without feedback control and based solely on input from the DAC. This simplifies the initial stage of acceleration and ensures that the acceleration is within safe parameters without causing an overcurrent condition. Once spindle motor 60 reaches the high spindle speed, step 614 may additionally optimize the power supply by enabling a smart ISO FET switch to reduce recirculation of power supply current, which could lead to waste through heat dissipation. Speed regulation of spindle motor 60 at the high spindle speed is then resumed.

After actuator arm 40 is parked in step 612 and spindle motor 60 reaches the high spindle speed in step 614, an iteration of the ABDR process is complete. As noted above, in a burnishing application, the ABDR process may be repeated multiple times per head. If the final iteration of the ABDR process has been performed, then spindle motor 60 may be accelerated back to a standard spin-up speed. If the final iteration has not yet been performed, then another iteration of the ABDR process is performed by repeating method 600.

Figures 7A, 7B, 7C, 7D:
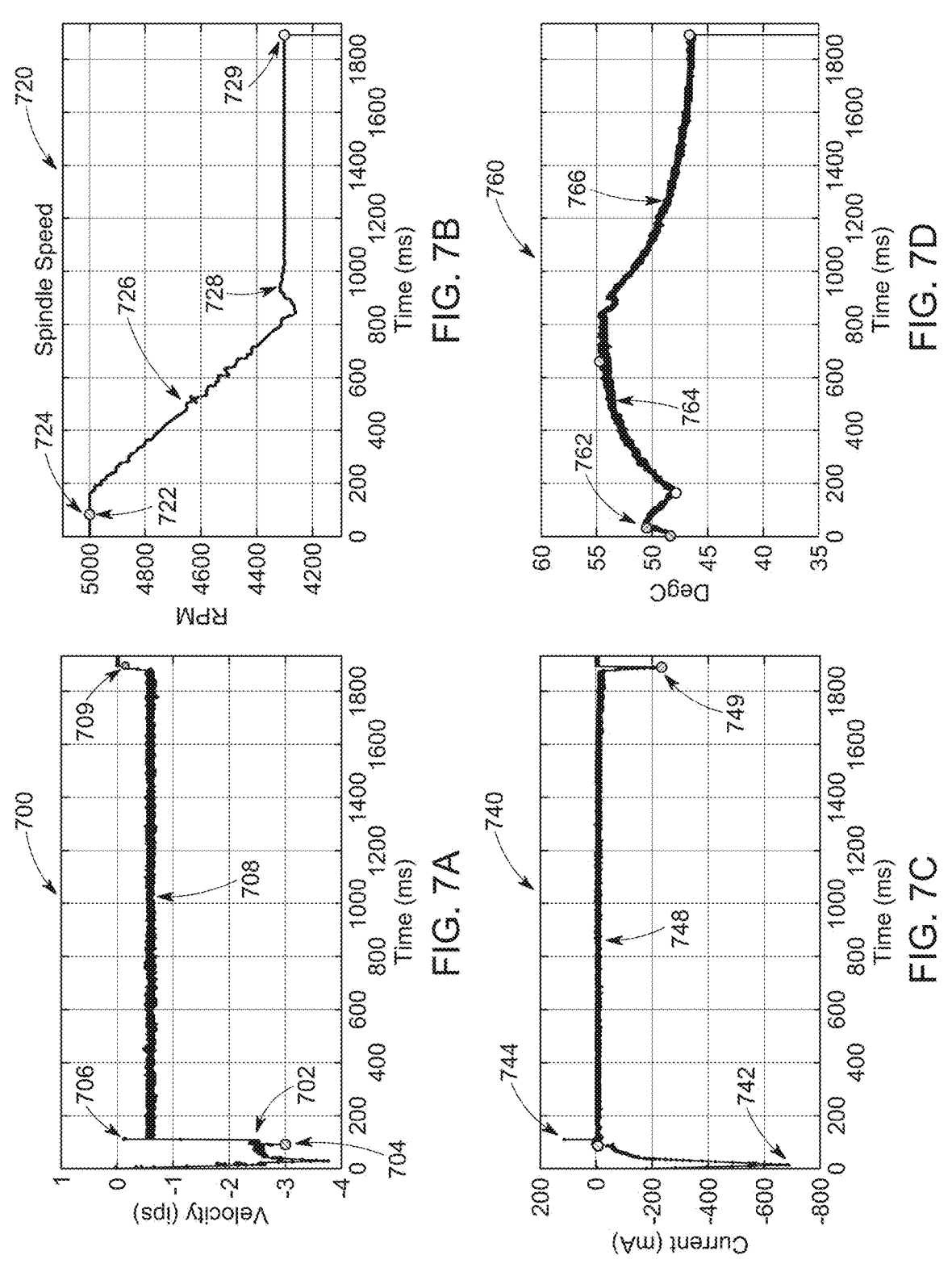
FIGS. 7A-7D are graphs showing data collected during an exemplary iteration of the ADBR process of FIGS. 5 and 6, as the actuator arm moves from the ODCS to the IDCS, in accordance with aspects of this disclosure.

FIGS. 7A-7D are graphs showing data collected during one exemplary iteration of the ABDR process of FIGS. 5 and 6 as actuator arm 40 moves from outer diameter area 70 to inner diameter area 72 of disk surface 17. In FIGS. 7A-7D, the horizontal axis represents time, with Oms indicating the start of step 604 when the head is loaded from the ramp to disk surface 17 at the initial velocity while spindle motor 60 is regulated at the high spindle speed, and about 1900 ms marking the arrival of actuator arm 40 at inner diameter area 72 (completion of step 606) while spindle motor 60 is regulated at the low spindle speed. FIG. 7A is a graph 700 showing the velocity of actuator arm 40 in inches per second (IPS) as it moves from outer diameter area 70 (Oms) to inner diameter area 72 (about 1900 ms). FIG. 7B is a graph 720 showing the speed of spindle motor 60 in RPMs as actuator arm 40 moves from the outer diameter area 70 to inner diameter area 72. FIG. 7C is a graph 740 showing the current of the actuator (VCM) 20 in mA as actuator arm 40 moves from outer diameter area 70 to inner diameter area 72. FIG. 7D is a graph 760 showing the center die temperature of the spindle motor substrate as actuator arm 40 is moved from outer diameter area 70 to inner diameter area 72.

With spindle motor 60 in speed regulation at the high spindle speed of about 5000 RPM (FIG. 7B; Oms), actuator arm 40 is loaded from the loading ramp to disk surface 17 at an initial velocity of about 2.5 IPS (FIG. 7A at 702). An initial spike in the current of actuator (VCM) 20 (FIG. 7C at 742) occurs while moving actuator arm 40 off of the ramp to disk surface 17. After actuator arm 40 has moved off the ramp, media (disk) contact occurs at about 100 ms (FIG. 7A at 704) and may be detected when the actuator/VCM current exceeds a predetermined threshold (FIG. 7C at 744). As can be seen at 706 of FIG. 7A, a transient may occur as actuator arm 40 is loaded onto the disk surface. For this reason, there may be a first delay (in one example, about 20 ms) following media contact (FIG. 7A at 704) before actuator arm 40 is decelerated from the initial velocity (about 2.5 IPS-FIG. 7A at 702) to a load velocity (about 0.6 IPS-FIG. 7A at 708).

Once actuator arm 40 has decelerated to the load velocity of about 0.6 IPS, it is maintained at the load velocity (FIG. 7A at 708) until it reaches inner diameter area 72 of disk surface 17 (FIG. 7A at 709). The VCM/actuator arm current is maintained at a steady level (FIG. 7C at 748) during this time. When actuator arm 40 initially decelerates to the load velocity, so as to not change the spindle speed and the actuator arm velocity at the same time, a second delay may be asserted before deceleration of spindle motor 60 begins (in one example, about 50 ms). Thus, as shown in FIG. 7B, there may be a delay from detection of media contact at 722 to start of spindle motor deceleration at 724 that is the sum of the first and second delays. Once the second delay has elapsed (FIG. 7B at 724), a spindle active brake is applied to begin decelerating spindle motor 60 to the low spindle speed of about 4300 RPM. As spindle motor 60 is decelerated by the active brake (FIG. 7B at 726), actuator arm 40 is simultaneously moved across disk 16 towards inner diameter area 72 at the load velocity (FIG. 7A at 708). In one example, spindle motor 60 reaches the low spindle speed (FIG. 7B at 728) just as actuator arm 40 reaches middle diameter area 74 of disk surface 17 at the load velocity. As can be seen in FIG. 7B, in this example, deceleration of spindle motor 60 from the high spindle speed to the low spindle speed takes about 600 ms, which is a deceleration rate of about 1.2 RPM/ms.

Once spindle motor 60 reaches the low spindle speed (FIG. 7B at 728), it is regulated (maintained) at the low spindle speed (step 646) as actuator arm 40 continues moving from middle diameter area 74 to inner diameter area 72 at the load velocity (FIG. 7A at 708). Once actuator arm 40 reaches inner diameter area 72 (FIG. 7A at 709), its velocity drops to near zero, with a corresponding saturation in the VCM/actuator arm current (FIG. 7C at 749) as actuator arm 40 pushes against the inner diameter crash stop (IDCS). Thus, the saturation current spike at 749 is an indicator that actuator arm 40 has reached the IDCS. Spindle motor 60 continues to be regulated at the low spindle speed (FIG. 7B at 729) when actuator arm 40 reaches the IDCS.

As shown in FIG. 7D, there is an initial spike 762 in the spindle motor die temperature as actuator arm 40 is loaded onto disk surface 17, and then a steady rise 764 in die temperature as spindle motor 60 is decelerated from the high spindle speed to the low spindle speed. This rise 764 in temperature is due to energy dissipation as the spindle active brake is applied to decelerate spindle motor 60. Once spindle motor 60 has reached and is regulated at the low spindle speed (i.e., active brake no longer being applied), energy dissipation decreases as seen by a steady fall 766 in the die temperature. It is important to monitor spindle motor die temperature to avoid overheating and possible damage.

Figures 8A, 8B, 8C:
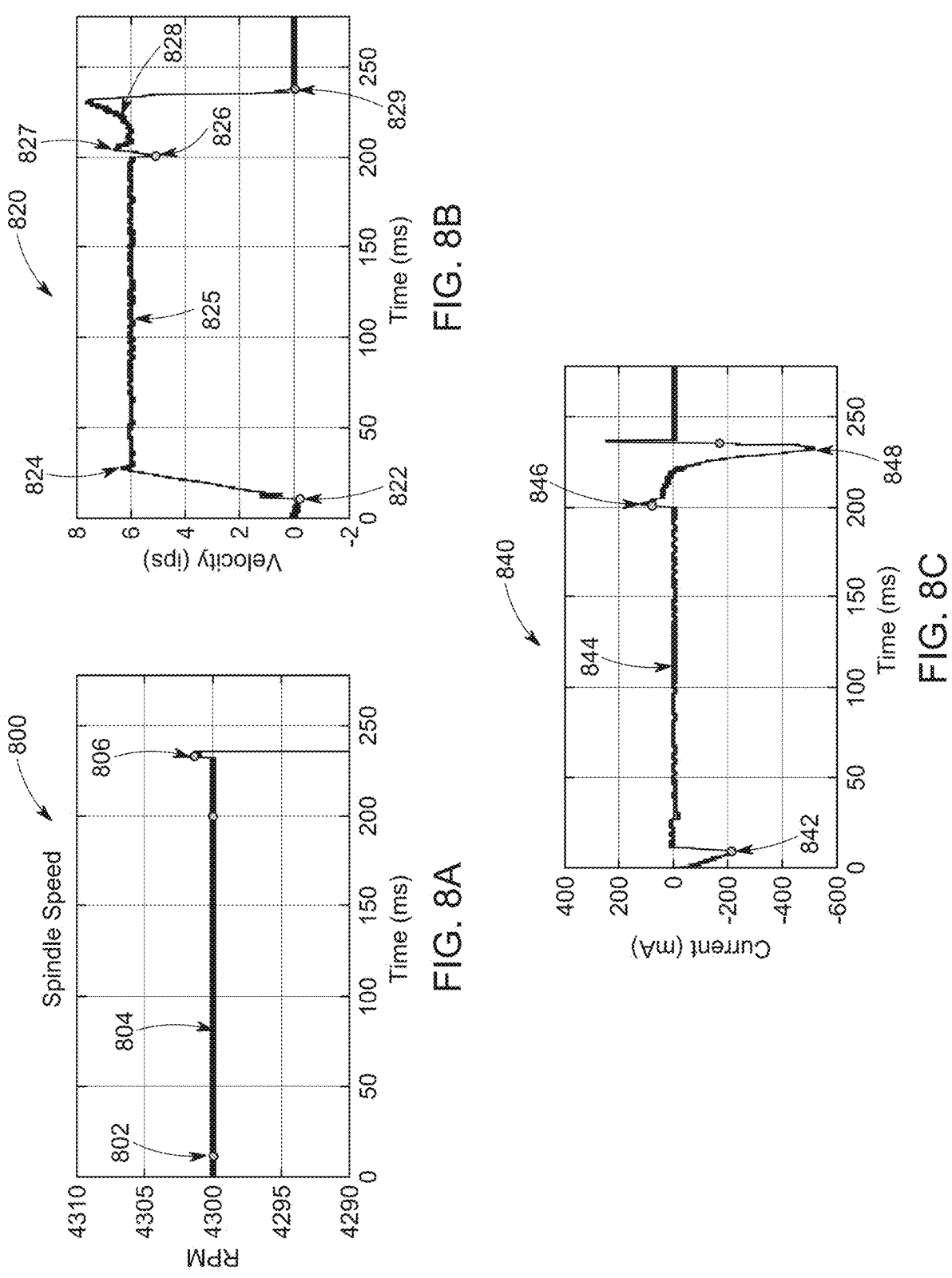
FIGS. 8A-8C are graphs showing data collected during an exemplary iteration of the ABDR process of FIGS. 5 and 6, as the actuator arm moves from the IDCS to be parked at the ODCS, in accordance with aspects of this disclosure.

FIGS. 8A-8C are graphs of data collected as actuator arm 40 is moved, after having reached inner diameter area 72 in step 646, from inner diameter area 72 to outer diameter area 70 to be parked on the ramp. In FIGS. 8A-8C, the horizontal axis represents time, with Oms being the start of movement of actuator arm 40 from inner diameter area 72 towards outer diameter area 70, and about 240 ms marking completion of parking. FIG. 8A is a graph 800 showing the speed of spindle motor 60 as actuator arm 40 is moved from inner diameter area 72 to outer diameter area 70 to be parked. FIG. 8B is a graph 820 showing the velocity of actuator arm 40 as it is moved from inner diameter area 72 to outer diameter area 70. FIG. 8C is a graph 840 showing the VCM/actuator arm current.

As can be seen in FIG. 8A, spindle motor 60 is regulated at the low spindle speed of about 4300 RPM during the entire time (FIG. 8A at 804) from when actuator arm 40 begins moving from inner diameter area 72 (FIG. 8A at 802) until it reaches outer diameter area 70 and is parked (FIG. 8A at 806). Actuator arm 40 is accelerated from a velocity of zero at inner diameter area 72 (FIG. 8B at 822) to its park velocity of about 6 IPS (FIG. 8B at 824). An initial VCM/actuator arm current spike occurs as actuator arm 40 is accelerated (FIG. 8C at 842). Actuator arm 40 is then moved across disk surface 177 from inner diameter area 72 to outer diameter area 70 at a constant park velocity of about 6 IPS (FIG. 8B at 825). When actuator arm 40 reaches the ramp (FIG. 8B at 826), there is a VCM/actuator arm current spike (FIG. 8C at 846) to move actuator arm 40 onto the ramp. Once it moves onto the ramp, a magnet pulls arm 840 to the outer diameter crash stop (ODCS), which causes the velocity of actuator arm 40 to increase (FIG. 8B at 827). VCM 20 pushes current in the opposite direction (FIG. 8C at 848) to counteract the increased velocity caused by the magnet force (FIG. 8C at 828) and to avoid head slap when actuator arm 40 reaches the ODCS. Once actuator arm 40 reaches the ODCS, it is parked and its velocity is reduced to zero, marking the end of the ABDR cycle. In a burnishing application, since spindle motor 60 is maintained at the low spindle speed as actuator arm 40 is parked, burnishing may take place even during the park movement. Adjustment of the park velocity downward may further enhance burnishing during parking by increasing friction.

The methods and flow diagrams disclosed herein are implemented by control circuitry 22, which may be implemented partially or wholly into a PLSI, an integrated circuit (IC) such as a system-on-a-chip (SOC), arm electronics, and/or any other suitable circuitry or controller. Control circuitry 22 may further comprise a microprocessor executing instructions operable to perform the methods and flow diagrams described herein. The instructions may be stored in a computer-readable medium, such as a non-volatile semiconductor memory device that may be external to the microprocessor or integrated with the microprocessor in an SOC. The instructions may alternatively be stored on a disk and read into a volatile semiconductor memory when the HDD is powered on. Control circuitry 22 may comprise logic circuitry such as state machine circuitry or other suitable logic circuitry. The methods and flow diagrams disclosed herein may be implemented using analog circuitry, digital circuitry, or a combination thereof.

One or more processing devices may comprise control circuitry 22 and may perform, individually and/or collectively, some or all of the functions of control circuitry 22. Such processing devices may be part of the HDD and/or abstracted away from physically proximity to the HDD. Such processing devices may be part of or proximate to one or more unitary products, racks comprising multiple data storage devices, physical or virtual servers, local area networks, storage area networks, data centers, and/or cloud services. Disk drives or HDDs as disclosed herein may include magnetic, optical, hybrid, or other types of disk drives. Devices such as computing devices, data servers, media content storage devices, and other devices may comprise the storage media and control circuitry described herein.

While certain embodiments are described herein, these embodiments are presented by way of example only, and do not limit the scope of this disclosure. Various omissions, substitutions and changes may be made without departing from the spirit and scope of this disclosure. The methods and processes described herein are not limited to any particular sequence and may be used independently or combined in various ways. Some method or process steps may be omitted and other steps added in some implementations. Nothing in this description implies that any particular feature, component, characteristic, or step is necessary or indispensable. Many variations, modifications, additions, and improvements are possible and fall within the scope of this disclosure as defined by the following claims.

The invention claimed is:

1. A data storage device comprising:
a disk;
a spindle on which the disk is mounted;
a spindle motor configured to rotate the spindle;
an actuator arm configured with a recording head;
an actuator configured to rotate the actuator arm about a pivot to move the actuator arm radially across a surface of the disk; and
control circuitry configured to:
control the actuator to move the actuator arm across the disk surface while simultaneously applying an active brake to decelerate the spindle by controlling a driver voltage of the spindle motor to be out of phase relative to a back electromotive force (BEMF) voltage of the spindle motor; and
increase a deceleration rate of the spindle by controlling the driver voltage of the spindle motor to be less than the BEMF voltage of the spindle motor.

2. The data storage device of claim 1, wherein the control circuitry is further configured to control the deceleration rate of the spindle by manipulating a phase difference and a differential between the driver voltage of the spindle motor and the BEMF voltage of the spindle motor.

3. The data storage device of claim 1, wherein the control circuitry is further configured to complete deceleration of the spindle to a low spindle speed before the actuator arm reaches an inner diameter area of the disk surface, as part of a process where the actuator arm is moved radially from an outer diameter area of the disk surface to the inner diameter area of the disk surface at a load velocity.

4. The data storage device of claim 3, wherein the control circuitry is further configured to complete deceleration of the spindle to the low spindle speed at about a time that the actuator arm reaches a middle diameter area of the disk surface.

5. The data storage device of claim 4, wherein the control circuitry is further configured to regulate the spindle motor to rotate the spindle at the low spindle speed while controlling the actuator to move the actuator arm from the middle diameter area of the disk surface to the inner diameter area of the disk surface.

6. The data storage device of claim 5, wherein when the actuator arm reaches the inner diameter area of the disk surface, the control circuitry is further configured to control the actuator to move the actuator arm from the inner diameter area of the disk surface to the outer diameter area of the disk surface at a park velocity that is greater than the load velocity while regulating the spindle motor to rotate the spindle at the low spindle speed.

7. The data storage device of claim 1, wherein the control circuitry is further configured to perform a burnishing process while controlling the actuator to move the actuator arm across the disk surface while simultaneously applying the active brake to decelerate the spindle to a low spindle speed.

8. The data storage device of claim 7, wherein the burnishing process is an in-field repair step triggered when a logged parameter of the data storage device reaches a threshold.

9. Control circuitry for controlling an actuator arm and a spindle of a data storage device, comprising:
an arm control circuit configured to control an actuator to move the actuator arm across a disk surface; and
a spindle control circuit configured to:
simultaneously with the arm control circuit controlling the actuator to move the actuator arm across the disk surface, apply an active brake to decelerate the spindle by controlling a driver voltage of a spindle motor to be out of phase relative to a back electromotive force (BEMF) voltage of the spindle motor; and
increase a deceleration rate of the spindle by controlling the driver voltage of the spindle motor to be less than the BEMF voltage of the spindle motor.

10. The control circuitry of claim 9, wherein the spindle control circuit is further configured to control the deceleration rate of the spindle by manipulating a phase difference and a differential between the driver voltage of the spindle motor and the BEMF voltage of the spindle motor.

11. The control circuitry of claim 9, wherein the spindle control circuit is further configured to complete deceleration of the spindle to a low spindle speed before the actuator arm reaches an inner diameter area of the disk surface, as part of a process where the actuator arm is moved radially from an outer diameter area of the disk surface to the inner diameter area of the disk surface at a load velocity.

12. The control circuitry of claim 11, wherein the spindle control circuit is further configured to complete deceleration of the spindle to the low spindle speed at about a time that the actuator arm reaches a middle diameter area of the disk surface.

13. The control circuitry of claim 12, wherein the spindle control circuit is further configured to regulate the spindle motor to rotate the spindle at the low spindle speed while the actuator arm moves from the middle diameter area of the disk surface to the inner diameter area of the disk surface.

14. The control circuitry of claim 13, wherein when the actuator arm reaches the inner diameter area of the disk surface, the arm control circuit is further configured to control the actuator to move the actuator arm from the inner diameter area of the disk surface to the outer diameter area of the disk surface at a park velocity that is greater than the load velocity; and the spindle control circuit is further configured to regulate the spindle motor to rotate the spindle at the low spindle speed while the arm control circuit controls the actuator to move the actuator arm from the inner diameter area of the disk surface to the outer diameter area of the disk surface at the park velocity.

15. A method for controlling an actuator arm and a spindle of a data storage device, the method comprising:

controlling an actuator to move the actuator arm across a disk surface;

simultaneously with moving the actuator arm across the disk surface, applying an active brake to decelerate the spindle by controlling a driver voltage of a spindle motor to be out of phase relative to a BEMF voltage of the spindle motor; and increasing a deceleration rate of the spindle by controlling the driver voltage of the spindle motor to be less than the BEMF voltage of the spindle motor.

16. The method of claim 15, further comprising:

performing a burnishing process while controlling the actuator to move the actuator arm across the disk surface while simultaneously applying the active brake to decelerate the spindle to a low spindle speed.

17. The method of claim 16, wherein the burnishing process comprises:

triggering an in-field repair step when a logged parameter of the data storage device reaches a threshold.

*   *   *   *   *